US012681304B2

(12) United States Patent (10) Patent No.: US 12,681,304 B2
Fu et al. (45) Date of Patent: Jul. 14, 2026

(54) WAVEGUIDE STRUCTURE AND DISPLAY DEVICE USING THE SAME

(71) Applicant: VisEra Technologies Company Limited, Hsin-Chu City (TW)

(72) Inventors: Po-Han Fu, Hsin-Chu City (TW); Hsin-Yi Hsieh, Hsin-Chu City (TW); Wei-Ko Wang, Hsin-Chu City (TW)

(73) Assignee: VisEra Technologies Company Limited, Hsin-Chu City (TW)

( * ) Notice: Subject to any disclaimer, the term of this patent is extended or adjusted under 35 U.S.C. 154(b) by 714 days.

(21) Appl. No.: 17/739,888

(22) Filed: May 9, 2022

(65) Prior Publication Data

US 2023/0359031 A1 Nov. 9, 2023

(51) Int. Cl.
*G02B 27/01* (2006.01)
*F21V 8/00* (2006.01)
*G02B 5/18* (2006.01)
*G02B 27/30* (2006.01)

(52) U.S. Cl.
CPC ....... *G02B 27/0172* (2013.01); *G02B 5/1871* (2013.01); *G02B 6/0026* (2013.01); *G02B 27/30* (2013.01)

(58) Field of Classification Search
CPC .... G02B 27/01–0189; G02B 2027/0105–0198
See application file for complete search history.

(56) References Cited

U.S. PATENT DOCUMENTS 10,845,526 B1 * 11/2020 Lee .................... G02B 27/0103
2019/0227316 A1 7/2019 Lee et al.

| | | | |
|---|---|---|---|
| 2020/0081246 A1 | 3/2020 | Olkkonen et al. | |
| 2020/0225498 A1 | 7/2020 | Potnis et al. | |
| 2020/0278498 A1 | 9/2020 | Schultz et al. | |
| 2020/0400951 A1 | 12/2020 | Zhang | |
| 2020/0408970 A1 * | 12/2020 | Calafiore | G02B 5/1857 |
| 2020/0409151 A1 * | 12/2020 | Calafiore | G02B 27/4272 |
| 2021/0072437 A1 * | 3/2021 | Singh | G02B 27/0172 |
| 2021/0080628 A1 | 3/2021 | Blomstedt et al. | |
| 2021/0141146 A1 * | 5/2021 | Melli | G02B 6/0063 |
| 2021/0199971 A1 | 7/2021 | Lee et al. | |

FOREIGN PATENT DOCUMENTS

| CN | 217156853 U | 8/2022 |
|---|---|---|
| JP | 2008139618 A | 6/2008 |
| JP | 2009186794 A | 8/2009 |
| JP | 2010262320 A | 11/2010 |
| JP | 2015118273 A | 6/2015 |

(Continued)

OTHER PUBLICATIONS

European Search Report of its corresponding EP application No. 22188813.4 issued on May 16, 2023;pp. 1-9.

*Primary Examiner* — Christopher A Lamb, II

(74) *Attorney, Agent, or Firm* — MUNCY, GEISSLER, OLDS & LOWE, P.C.

(57) ABSTRACT

A waveguide structure is provided. The waveguide structure includes waveguide combiners stacked one upon the other. Each waveguide combiner includes a waveguide plate and an input coupler disposed on the waveguide plate. The input coupler of at least one waveguide combiner includes first grating pillars, and each first grating pillar has a gradually changing refractive index.

20 Claims, 7 Drawing Sheets

(56) References Cited

FOREIGN PATENT DOCUMENTS

| JP | 2017004004 | A | 1/2017 |
| KR | 2019-0039801 | | 4/2019 |
| WO | WO2021133965 | A1 | 7/2021 |
| WO | WO2021169383 | A1 | 9/2021 |
| WO | WO 2022/049104 | A1 | 3/2022 |

* cited by examiner

WAVEGUIDE STRUCTURE AND DISPLAY DEVICE USING THE SAME

BACKGROUND

Technical Field

The embodiments of the present disclosure relate to a waveguide structure and a display device using the same, and in particular the waveguide structure includes waveguide combiners that include an input coupler having a gradually changing refractive index.

Description of the Related Art

Near-eye displays, such as those used in virtual reality (VR), augmented reality (AR), and mixed reality (MR) devices, have become more and more popular as the technology has advanced. A near-eye display may display virtual objects or combine images of real objects with virtual objects. For example, users may view blended images of virtual objects (e.g., computer-generated images (CGIs)) and the surrounding environment at the same time in an AR system, which can be widely used in various fields such as medical, education, logistics, e-Health, and manufacturing.

However, when an image of a virtual object is to be transmitted to the user's field of vision (FoV), problems such as low coupling efficiency and insufficient field of view are often caused due to the different wavelengths of different colors. This may cause various undesirable conditions, such as an incomplete image display, an image displayed at the wrong scale, or a color shift.

BRIEF SUMMARY

In some embodiments of the present disclosure, the display device (e.g., AR, VE, or MR devices) includes a waveguide structure that includes waveguide combiners stacked one upon the other. At least one input coupler of the waveguide combiner has a gradually changing refractive index, which may effectively improve the coupling efficiency and the user's field of vision (FoV).

In accordance with some embodiments of the present disclosure, a waveguide structure is provided. The waveguide structure includes waveguide combiners stacked one upon the other. Each waveguide combiner includes a waveguide plate and an input coupler disposed on the waveguide plate. The input coupler of at least one waveguide combiner includes first grating pillars, and each first grating pillar has a gradually changing refractive index.

In some embodiments, there are two or more waveguide combiners.

In some embodiments, each first grating pillar has stacked layers, and there are between two and thirty stacked layers.

In some embodiments, the thicknesses of the stacked layers are different.

In some embodiments, the total height of the stacked layers is in a range from 40 nm to 1000 nm.

In some embodiments, the gradually changing refractive index has a maximum refractive index and a minimum refractive index, and the difference between the maximum refractive index and the minimum refractive index is greater than 0, and less than or equal to 2.1.

In some embodiments, the gradually changing refractive index is in a range from 1.4 to 3.5.

In some embodiments, the first grating pillars are formed in a periodic arrangement, and the period of the periodic arrangement is in a range from 250 nm to 750 nm.

In some embodiments, from a cross-sectional view of the waveguide structure, the profile of each first grating pillar has two parallel sides.

In some embodiments, the profile of each first grating pillar is a trapezoid, the two parallel sides are an upper base and a lower base, and the lower base is closer to the waveguide plate than the upper base.

In some embodiments, the lower base is longer than the upper base.

In some embodiments, the waveguide plate has a constant refractive index in a range from 1.5 to 3.

In some embodiments, each waveguide combiner further includes an expander disposed on the waveguide plate and adjacent to the input coupler.

In some embodiments, the expander includes second grating pillars, and the distance between two adjacent second grating pillars is constant.

In some embodiments, the second grating pillars have different widths.

In some embodiments, the second grating pillars have different thicknesses.

In some embodiments, each waveguide combiner further includes an output coupler disposed on the waveguide plate, wherein the expander is disposed between the input coupler and the output coupler.

In some embodiments, the waveguide combiners are used to couple different color lights, and the different color lights have wavelengths from 380 nm to 750 nm.

In accordance with some embodiments of the present disclosure, a display device is provided. The display device includes an image source and a waveguide structure configured to couple lights from the image source. The waveguide structure includes waveguide combiners stacked one upon the other. Each waveguide combiner includes a waveguide plate and an input coupler disposed on the waveguide plate. The input coupler of at least one waveguide combiner includes first grating pillars, and each first grating pillar has a gradually changing refractive index.

In some embodiments, the display device further includes a collimator disposed between the image source and the waveguide structure.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

DETAILED DESCRIPTION

Figure 1:
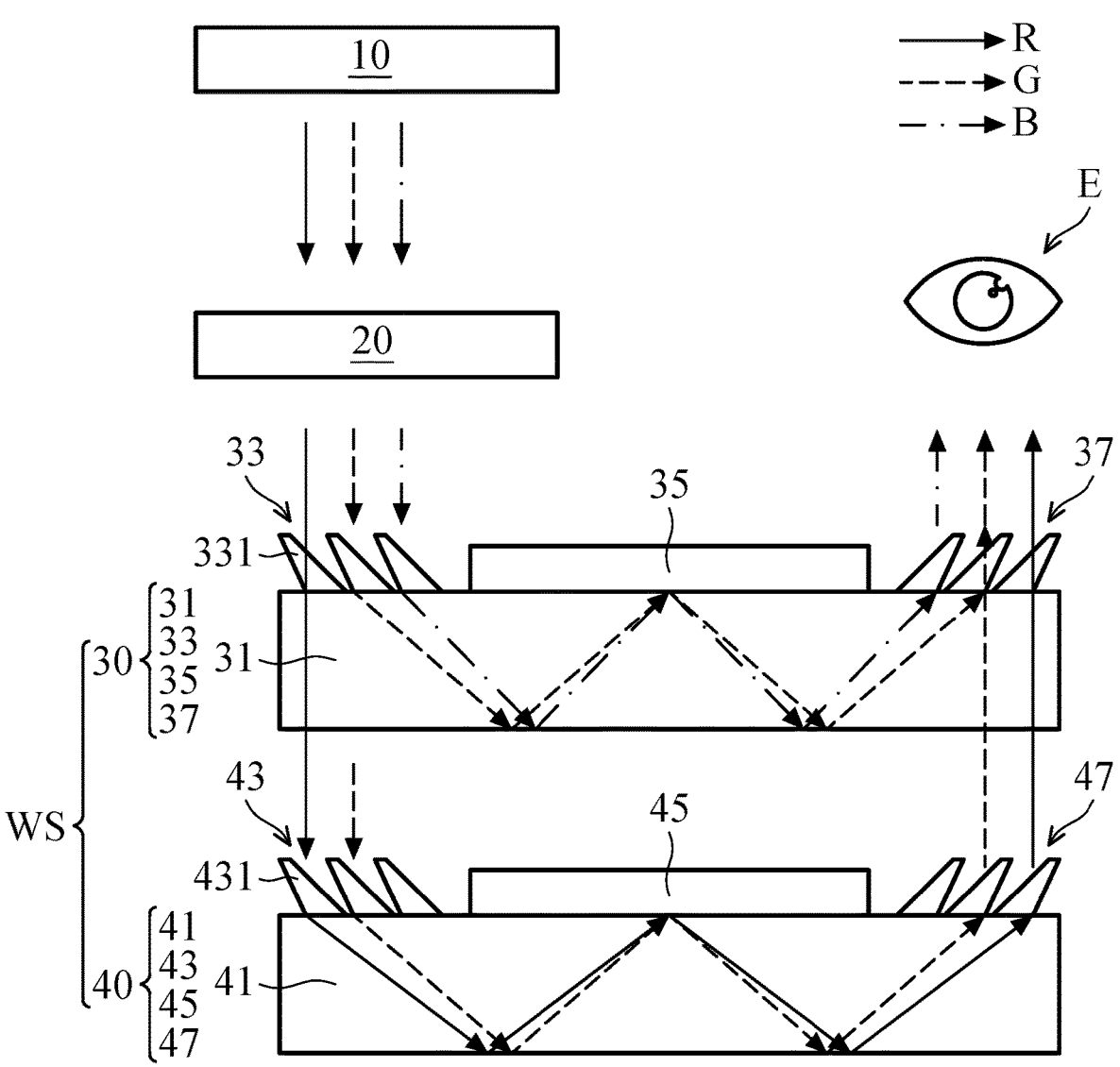
FIG. 1 is a schematic diagram illustrating a display device according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a schematic diagram illustrating a display device 100 according to some embodiments of the present disclosure. It should be noted that some components are not presented in their actual structures in FIG. 1, and some components of the display device 100 have been omitted for sake of brevity. Moreover, the display device 100 may be a near-eye display that may be applied in virtual reality (VR), augmented reality (AR), or mixed reality (MR), but the present disclosure is not limited thereto.

Referring to FIG. 1, in some embodiments, the display device 100 includes an image source 10. For example, the image source 10 may be used to display images of virtual objects. The image source 10 may be various light sources that may emit different color lights in the range of visible wavelengths (e.g., wavelengths from about 380 nm to about 750 nm), but the present disclosure is not limited thereto. The image source 10 may include a liquid-crystal display (LCD), a light-emitting diode (LED), an organic light-emitting diode (OLED), an active matrix organic light-emitting diode (AMOLED), a liquid-crystal on silicon (LCoS), a digital light processing (DLP), RGB laser, any other applicable device, or a combination thereof.

Referring to FIG. 1, in some embodiments, the display device 100 includes a waveguide structure WS configured to couple lights (e.g., red light R, green light G, and/or blue light B) from the image source 10. It should be noted that FIG. 1 shows a cross-sectional view of the waveguide structure WS. As shown in FIG. 1, in some embodiments, the waveguide structure WS includes a waveguide combiner 30 and a waveguide combiner 40 that are stacked one upon the other. In particular, the waveguide combiner 30 is disposed on the waveguide combiner 40.

As shown in FIG. 1, in some embodiments, the waveguide combiner 30 includes a waveguide plate 31. For example, the waveguide plate 31 may include transparent dielectric material (e.g., glass) that has a constant refractive index in a range from about 1.5 to about 3.0, but the present disclosure is not limited thereto. Moreover, the waveguide plate 31 may be formed by a deposition process, such as a chemical vapor deposition (CVD) process, an atomic layer deposition (ALD) process, a spin coating process, any other applicable process, or a combination thereof, but the present disclosure is not limited thereto.

As shown in FIG. 1, in some embodiments, the waveguide combiner 30 includes an input coupler 33 disposed on the waveguide plate 31. As shown in FIG. 1, in some embodiments, the input coupler 33 of the waveguide combiner 30 includes grating pillars 331, and each grating pillar 331 has a gradually changing refractive index. In some embodiments, the gradually changing refractive index is in a range from about 1.4 to about 3.5.

Figure 2:
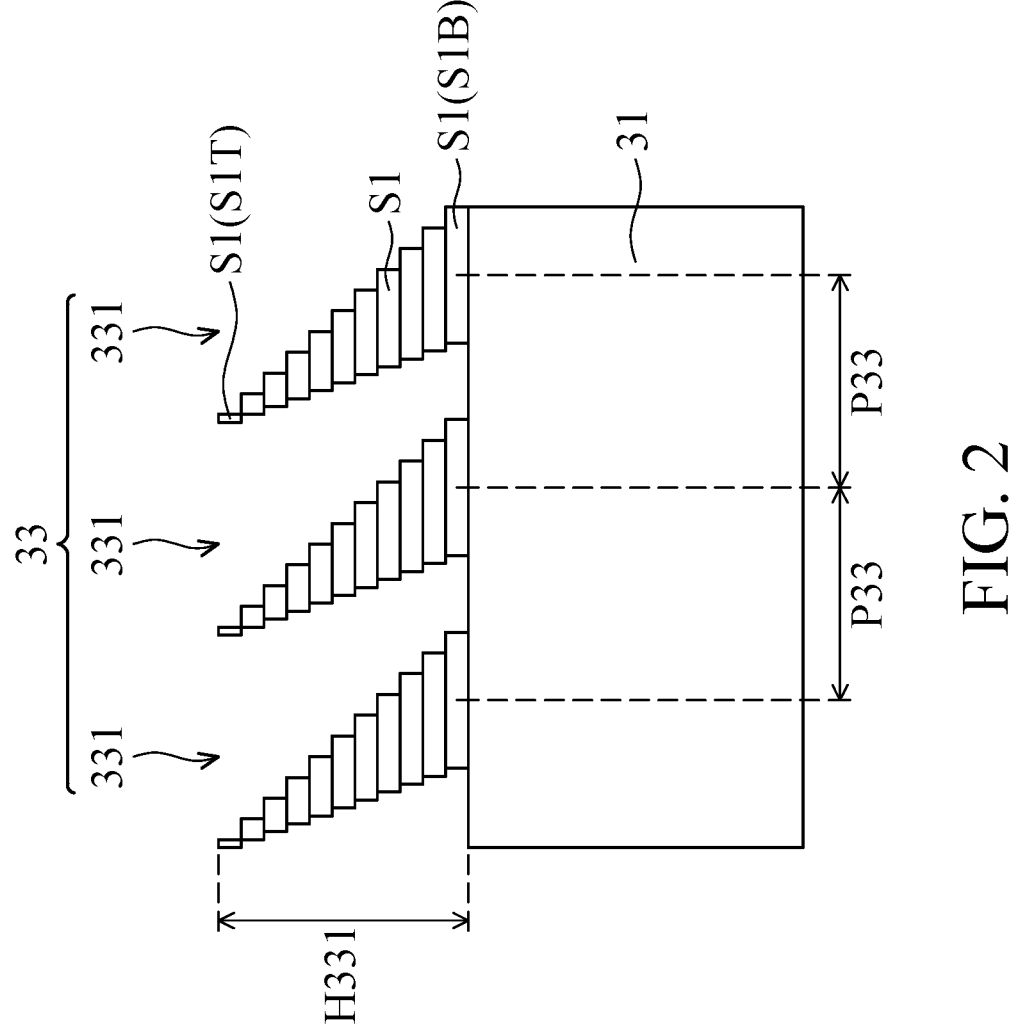
FIG. 2 is a partial cross-sectional view illustrating the waveguide plate and the grating pillars according to some embodiments of the present disclosure.

FIG. 2 is a partial cross-sectional view illustrating the waveguide plate 31 and the grating pillars 331 according to some embodiments of the present disclosure. In some embodiments, each grating pillar 331 has stacked layers S1 (see FIG. 2), and there are between two and thirty stacked layers S1. For example, as shown in FIG. 2, each grating pillar 331 has stacked layers S1, and there are eleven stacked layers S1, but the present disclosure is not limited thereto. Moreover, the stacked layers S1 may be formed by a deposition process. Examples of the deposition process are described above, and will not be repeated here.

In some embodiments, the stacked layers S1 of the grating pillar 331 include different material or have different concentrations, so that the grating pillar 331 has a gradually changing refractive index. In some embodiments, the gradually changing refractive index of the grating pillar 331 has a maximum refractive index (e.g., the refractive index of the stacked layer S1B at the bottom of the grating pillar 331) and a minimum refractive index (e.g., the refractive index of the stacked layer S1T at the top of the grating pillar 331), and the difference between the maximum refractive index and the minimum refractive index is greater than 0, and less than or equal to about 2.1.

For example, the refractive index of the stacked layer S1T at the top of the grating pillar 331 may be about 1.77, the refractive index of the stacked layer S1B at the bottom of the grating pillar 331 may be about 2.40, and the difference between the refractive index of the stacked layer S1B and the refractive index of the stacked layer S1T is about 0.63, but the present disclosure is not limited thereto.

Moreover, the refractive indices of the stacked layers between the stacked layer S1T and the stacked layer S1B are in a range from about 1.77 to about 2.40. That is, the grating pillar 331 may have a gradually increasing refractive index from top to bottom, but the present disclosure is not limited thereto.

In the embodiment shown in FIG. 2, each stacked layer S1 has the same thickness, but the present disclosure is not limited thereto. In some other embodiments, thicknesses of the stacked layers S1 are different. As shown in FIG. 2, in some embodiments, the total height H331 of the stacked layers S1 is in a range from about 40 nm to about 1000 nm.

As shown in FIG. 1 and FIG. 2, in some embodiments, the grating pillars 331 are formed in a periodic arrangement, and the period P33 of the periodic arrangement is in a range from about 250 nm to about 750 nm, such as about 326 nm. In other words, the distance between two adjacent grating pillars 331 may be constant, but the present disclosure is not limited thereto.

Figures 3A, 3B, 3C, 3D, 3E:
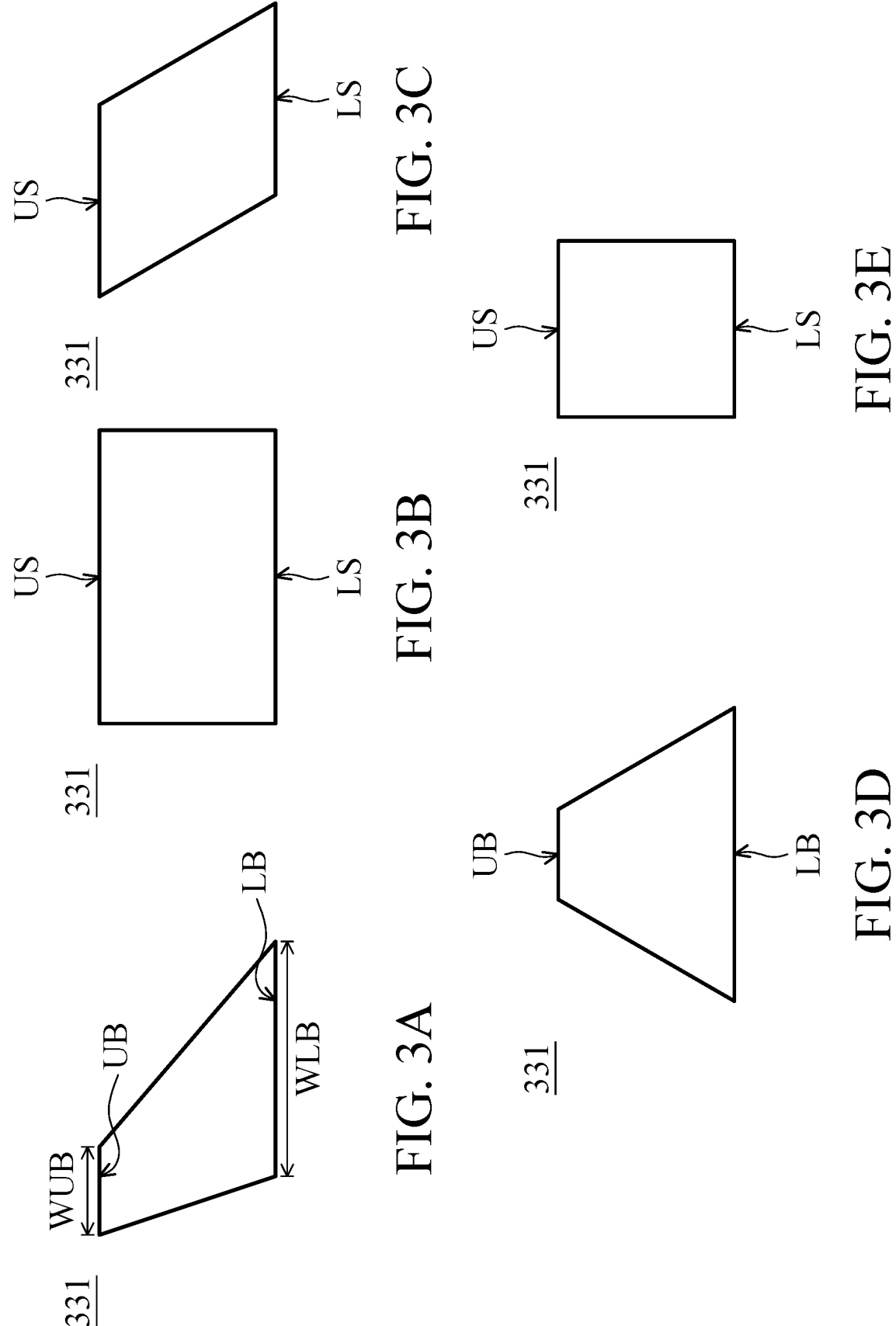
FIG. 3A is an enlarged view illustrating the grating pillar according to some embodiments of the present disclosure.
FIGS. 3B-3E are different enlarged views illustrating the grating pillar according to some other embodiments of the present disclosure.

FIG. 3A is an enlarged view illustrating the grating pillar 331 according to some embodiments of the present disclosure. As shown in FIG. 1 and FIG. 3A, from a cross-sectional view of the waveguide structure WS, the profile of each grating pillar 331 is a trapezoid. As shown in FIG. 3A, in some embodiments, the profile of each grating pillar 331 has two parallel sides, an upper base UB and a lower base LB, and the lower base LB is closer to the waveguide plate 31 than the upper base UB.

As shown in FIG. 3A, in some embodiments, the lower base LB is longer than the upper base UB. That is, the width WLB of the lower base LB may be greater than the width WUB of the upper base UB, but the present disclosure is not limited thereto. As shown in FIG. 1 and FIG. 3A, the lower base LB of the grating pillar 331 may be attached to the waveguide plate 31, but the present disclosure is not limited thereto.

FIGS. 3B-3E are different enlarged views illustrating the grating pillar 33 1 according to some other embodiments of the present disclosure. In some embodiments, from a cross-sectional view of the waveguide structure WS, the profile of each grating pillar 331 has two parallel sides.

As shown in FIG. 3B, the profile of each grating pillar 331 is a rectangle, the two parallel sides are the upper side US and the lower side LS. As shown in FIG. 3C, the profile of each grating pillar 331 is a parallelogram, the two parallel sides are the upper side US and the lower side LS. As shown in FIG. 3D, the profile of each grating pillar 331 is an isosceles trapezoid, the two parallel sides are the upper base UB and the lower base LB. As shown in FIG. 3E, the profile of each grating pillar 331 is a square, the two parallel sides are the upper side US and the lower side LS. It should be noted that the profile of each grating pillar 331 is not limited to FIGS. 3A-3E, which may be changed as needed.

Referring to FIG. 1, in some embodiments, the waveguide combiner 30 further includes an expander 35 disposed on the waveguide plate 31 and adjacent to the input coupler 33. For example, the expander 35 may use a two-dimensional (2D) pupil expansion technique, which may include grating structures to release the display image, but the present disclosure is not limited thereto.

Figure 4A:
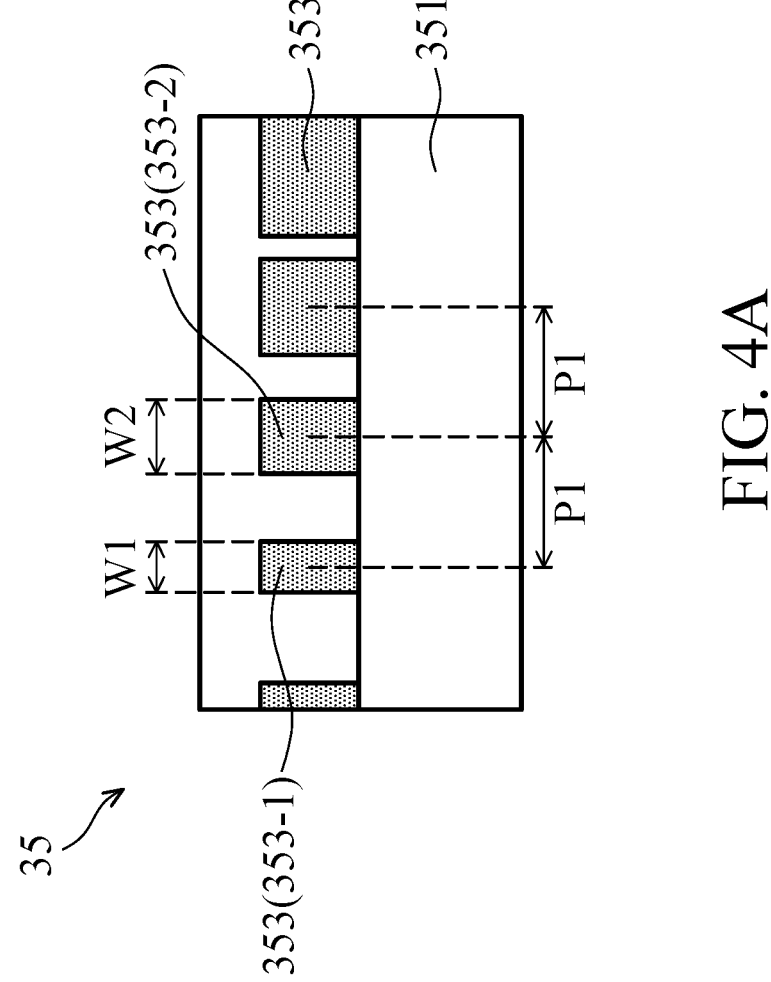
FIG. 4A is a partial cross-sectional view illustrating the expander according to some embodiments of the present disclosure.

FIG. 4A is a partial cross-sectional view illustrating the expander 35 according to some embodiments of the present disclosure. Referring to FIG. 4A, in some embodiments, the expander 35 includes grating pillars 353, and the distance between two adjacent grating pillars 353 is constant. In other words, in some embodiments, the grating pillars 353 are formed in a periodic arrangement, and the period P1 of the periodic arrangement is constant. It should be noted that the grating pillars 353 are disposed on the waveguide plate 351 in FIG. 4A, but the waveguide plate 351 may be another waveguide plate or a portion of the waveguide plate 31, which may be adjusted as needed.

In some embodiments, the grating pillars 353 have different widths. For example, as shown in FIG. 4A, the width W1 of the grating pillar 353-1 is shorter than the width W2 of the adjacent grating pillar 353-2, but the present disclosure is not limited thereto.

Figure 4B:
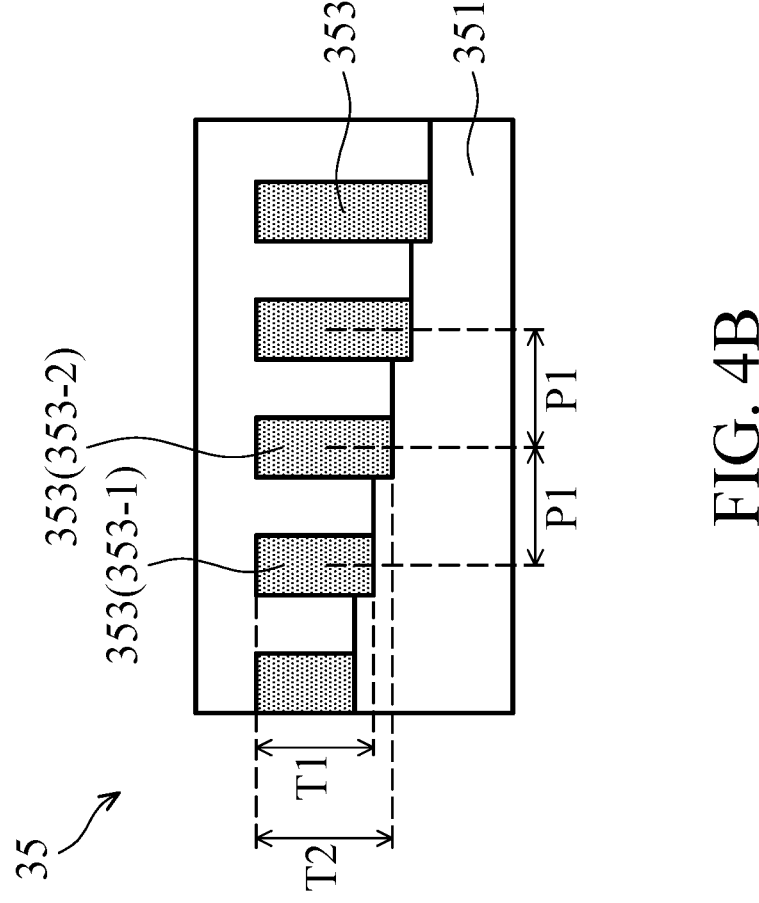
FIG. 4B is a partial cross-sectional view illustrating the expander according to some other embodiments of the present disclosure.

FIG. 4B is a partial cross-sectional view illustrating the expander 35 according to some other embodiments of the present disclosure. Referring to FIG. 4B, similarly, the expander 35 includes grating pillars 353, and the distance between two adjacent grating pillars 353 is constant. In other words, in some embodiments, the grating pillars 353 are formed in a periodic arrangement, and the period P1 of the periodic arrangement is constant.

In some embodiments, the grating pillars 353 have different thicknesses. For example, as shown in FIG. 4B, the thickness T1 of the grating pillar 353-1 is less than the thickness T2 of the adjacent grating pillar 353-2, but the present disclosure is not limited thereto.

As shown in FIG. 1, in some embodiments, the waveguide combiner 30 includes an output coupler 37 disposed on the waveguide plate 31. In more detail, the expander 35 is disposed between the input coupler 33 and the output coupler 37.

Referring to FIG. 1, the waveguide combiner 40 has a structure that is similar to the waveguide combiner 30. As shown in FIG. 1, in some embodiments, the waveguide combiner 40 includes a waveguide plate 41 and an input coupler 43 disposed on the waveguide plate 41. As shown in FIG. 1, in some embodiments, the input coupler 43 of the waveguide combiner 40 includes grating pillars 431.

Figure 5:
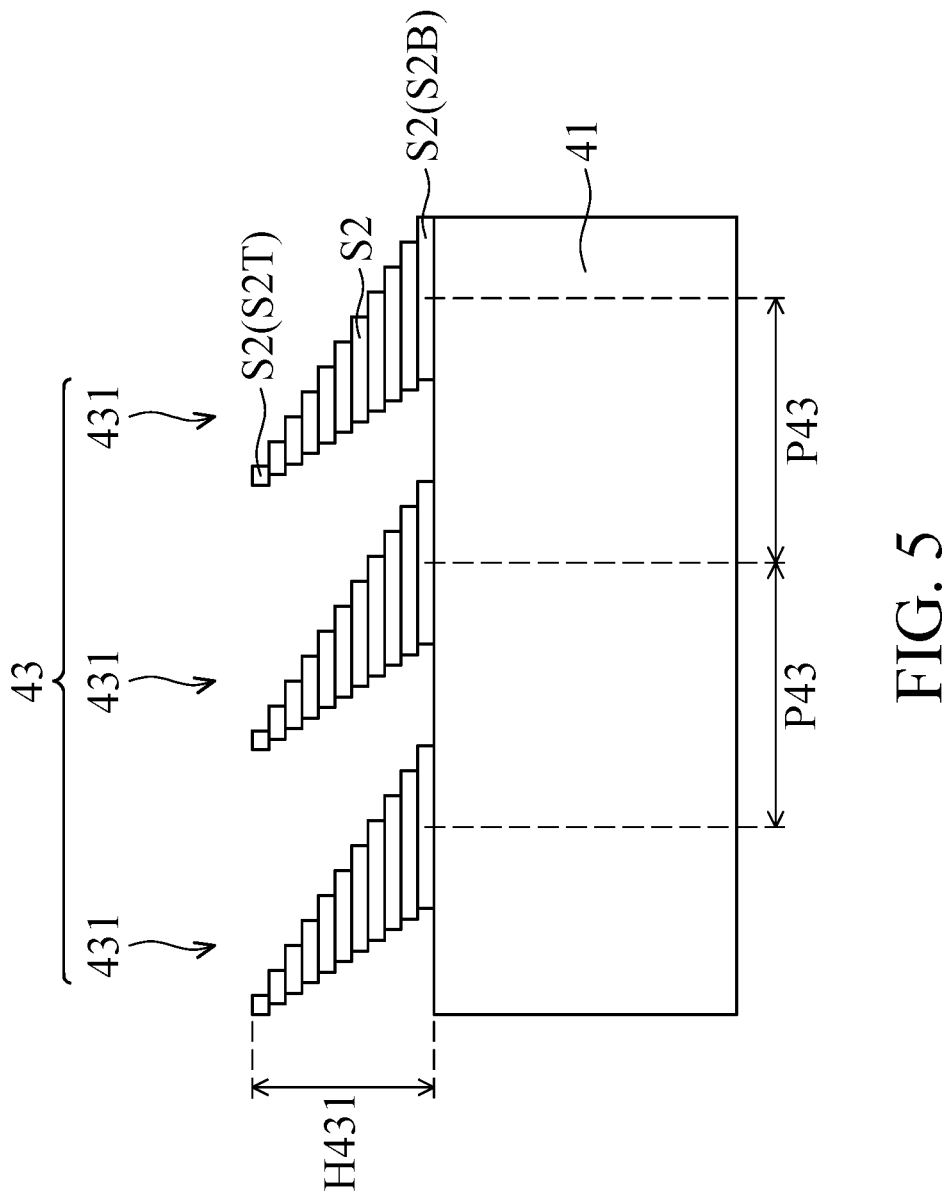
FIG. 5 is a partial cross-sectional view illustrating the waveguide plate and the grating pillars according to some embodiments of the present disclosure.

FIG. 5 is a partial cross-sectional view illustrating the waveguide plate 41 and the grating pillars 431 according to some embodiments of the present disclosure. In some embodiments, each grating pillar 431 has stacked layers S2 (see FIG. 5), and there are between two and thirty stacked layers S2. For example, as shown in FIG. 5, each grating pillar 431 has stacked layers S2, and there are eleven stacked layers S2, but the present disclosure is not limited thereto. In some other embodiments, the number of stacked layers S2 in the grating pillar 431 is different from the number of stacked layers S1 in the grating pillar 331. Moreover, the stacked layers S2 may be formed by a deposition process. Examples of the deposition process are described above, and will not be repeated here.

In some embodiments, the stacked layers S2 of the grating pillar 431 include the same material or have the same concentration, so that the grating pillar 431 has a constant refractive index. For example, the refractive index of the stacked layer S2T at the top of the grating pillar 431 may be about 2.40, the refractive index of the stacked layer S2B at the bottom of the grating pillar 431 may be about 2.40, and the difference between the refractive index of the stacked layer S2B and the refractive index of the stacked layer S2T is about 0, but the present disclosure is not limited thereto.

In some other embodiments, the stacked layers S2 of the grating pillar 431 are similar to the stacked layers S1 of the grating pillar 331. That is, the stacked layers S2 of the grating pillar 431 include different material or have different concentrations, so that the grating pillar 431 has a gradually changing refractive index.

In the embodiment shown in FIG. 5, each stacked layer S2 has the same thickness, but the present disclosure is not limited thereto. In some other embodiments, thicknesses of the stacked layers S2 are different. As shown in FIG. 5, in some embodiments, the total height H431 of the stacked layers S2 is in a range from about 40 nm to about 1000 nm.

As shown in FIG. 1 and FIG. 5, in some embodiments, the grating pillars 431 are formed in a periodic arrangement, and the period P43 of the periodic arrangement is in a range from about 250 nm to about 750 nm, such as about 449 nm. In other words, the distance between two adjacent grating pillars 431 may be constant, but the present disclosure is not limited thereto. In this embodiment, the profile of the grating pillar 431 is the same as or similar to the profile of each grating pillar 331, but the present disclosure is not limited thereto. In some other embodiments, the profile of the grating pillar 431 is different from the profile of each grating pillar 331, which may be adjusted as needed.

As shown to FIG. 1, in some embodiments, the waveguide combiner 40 further includes an expander 45 disposed on the waveguide plate 41 and adjacent to the input coupler 43. Similarly, the expander 45 may use a two-dimensional (2D) pupil expansion technique, which may include grating structures to release the display image, but the present disclosure is not limited thereto. In this embodiment, the expander 45 has a structure that is similar to expander 35, but the present disclosure is not limited thereto.

As shown in FIG. 1, in some embodiments, the waveguide combiner 40 includes an output coupler 47 disposed on the waveguide plate 41. In more detail, the expander 45 is disposed between the input coupler 43 and the output coupler 47.

In some embodiments, the waveguide combiner 30 and the waveguide combiner 40 are used to couple different color lights, and the different color lights have wavelengths from about 380 nm to about 750 nm (e.g., visible lights). For example, as shown in FIG. 1, the waveguide combiner 30 may be used to couple green light G and blue light B, and the waveguide combiner 40 may be used to couple red light R and green light G, but the present disclosure is not limited thereto.

As shown in FIG. 1, in some embodiments, the display device 100 further includes a collimator 20 disposed between the image source 10 and the waveguide structure WS. The collimator 20 may change the diverging light or other radiation from the image source 10 into a parallel beam, so that lights form the image source 10 may enter the waveguide structure WS smoothly. As shown in FIG. 1, the image (lights) from the image source 10 may enter the waveguide structure WS through the collimator 20, and then be transmitted to and presented in the user's eyes E.

Compared with the traditional near-eye display, the display device 100 according to the embodiments of the present disclosure may effectively improve the coupling efficiency, for example, from about 62% to about 83% due to the waveguide structure WS. Furthermore, the user's field of vision (FoV) may also be improved, for example, from about 42.5° to about 60°, which is close to the inherent material limitations.

Figure 6:
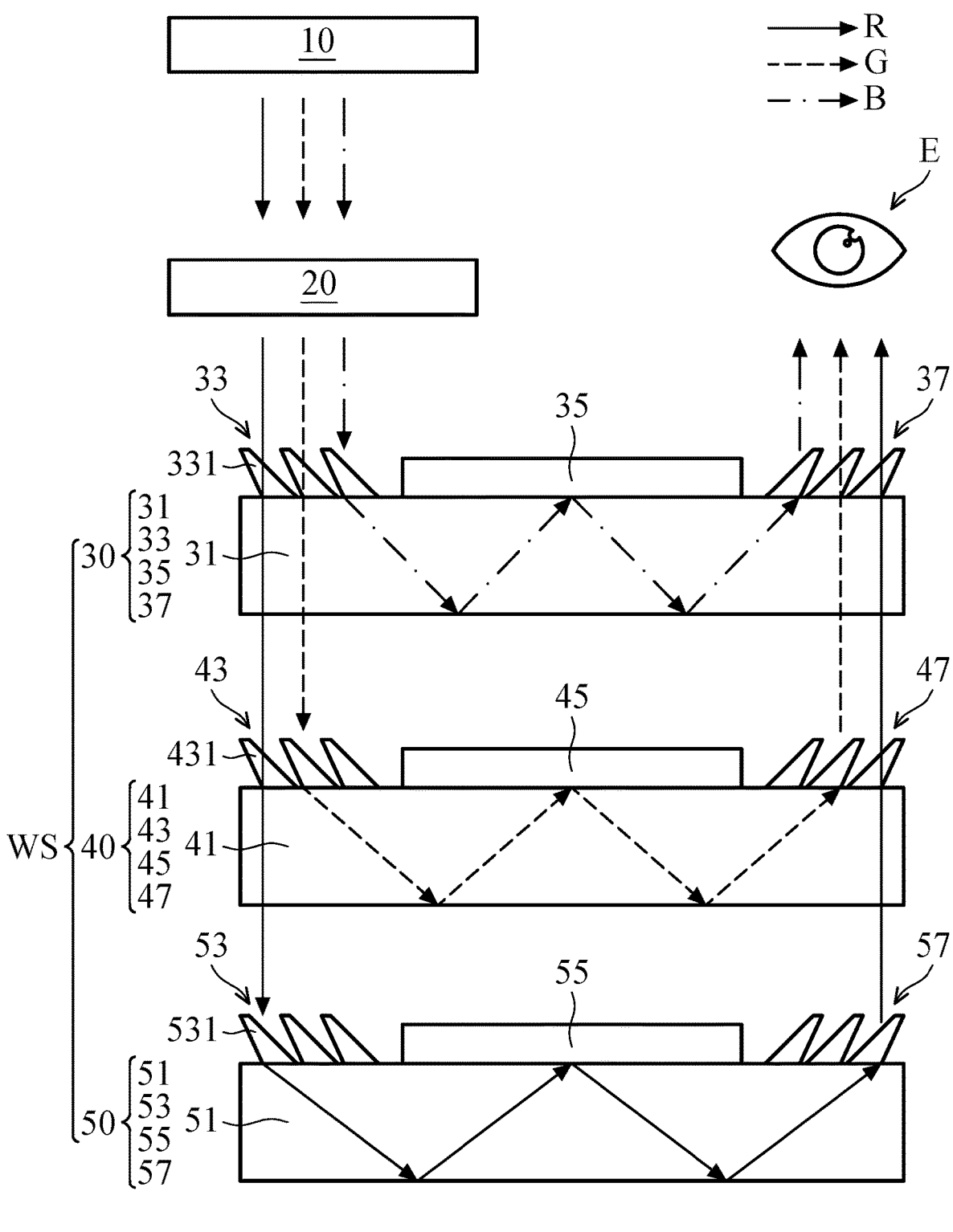
FIG. 6 is a schematic diagram illustrating a display device according to some other embodiments of the present disclosure.

FIG. 6 is a schematic diagram illustrating a display device 102 according to some other embodiments of the present disclosure. Similarly, some components are not presented in their actual structures in FIG. 6, and some components of the display device 102 have been omitted for sake of brevity.

Referring to FIG. 6, the display device 102 has a structure that is similar to the display device 100. In some embodiments, the waveguide structure WS of the display device 102 further includes a waveguide combiner 50 that is stacked on the waveguide combiner 30 and the waveguide combiner 40. In more detail, the waveguide combiner 40 may be disposed between the waveguide combiner 30 and the waveguide combiner 50, but the present disclosure is not limited thereto.

Referring to FIG. 6, the waveguide combiner 50 has a structure that is similar to the waveguide combiner 30 or the waveguide combiner 40. As shown in FIG. 6, in some embodiments, the waveguide combiner 50 includes a waveguide plate 51 and an input coupler 53 disposed on the waveguide plate 51. As shown in FIG. 6, in some embodiments, the input coupler 53 of the waveguide combiner 50 includes grating pillars 531.

As shown to FIG. 6, in some embodiments, the waveguide combiner 50 further includes an expander 55 disposed on the waveguide plate 51 and adjacent to the input coupler 53. Similarly, the expander 55 may use a two-dimensional (2D) pupil expansion technique, which may include grating structures to release the display image, but the present disclosure is not limited thereto. In this embodiment, the expander 55 has a structure that is similar to the expander 35 or the expander 45, but the present disclosure is not limited thereto.

As shown in FIG. 6, in some embodiments, the waveguide combiner 50 includes an output coupler 57 disposed on the waveguide plate 51. In more detail, the expander 55 is disposed between the input coupler 53 and the output coupler 57.

In some embodiments, the waveguide combiner 30, the waveguide combiner 40, and the waveguide combiner 50 are used to couple different color lights, and the different color lights have wavelengths from about 380 nm to about 750 nm (e.g., visible lights). For example, as shown in FIG. 6, the waveguide combiner 30 may be used to couple blue light B, the waveguide combiner 40 may be used to couple green light G, and the waveguide combiner 50 may be used to couple red light-G R, but the present disclosure is not limited thereto.

It should be noted that the number of waveguide combiners is not limited to the embodiment shown in FIG. 1 (in which there are two waveguide combiners) or the embodiment shown in FIG. 6 (in which there are three waveguide combiners). In some embodiments, there are two or more waveguide combiners.

In summary, in some embodiments of the present disclosure, the display device (e.g., AR, VE, or MR devices) includes a waveguide structure that includes waveguide combiners stacked one upon the other. At least one input coupler of the waveguide combiner has a gradually changing refractive index, which may effectively improve the coupling efficiency and the user's field of vision (FoV).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A waveguide structure, comprising:
waveguide combiners stacked one upon the other, wherein each of the waveguide combiners comprises:
    a waveguide plate; and
    an input coupler disposed on the waveguide plate;
    wherein the input coupler of at least one of the waveguide combiners comprises first grating pillars, each of the first grating pillars has a plurality of stacked layers, a lower stacked layer of the plurality of stacked layers includes at least one upper surface exposed from an upper stacked layer of the plurality of stacked layers, and each of the first grating pillars has a gradually increasing refractive index from a topmost layer to a bottommost layer of the plurality of stacked layers.

2. The waveguide structure as claimed in claim 1, wherein the number of waveguide combiners is greater than or equal to two.

3. The waveguide structure as claimed in claim 1, wherein the number of the plurality of stacked layers is less than or equal to thirty.

4. The waveguide structure as claimed in claim 3, wherein thicknesses of the plurality of stacked layers are different.

5. The waveguide structure as claimed in claim 3, wherein a total height of the plurality of stacked layers is in a range from 40 nm to 1000 nm.

6. The waveguide structure as claimed in claim 1, wherein the gradually increasing refractive index has a maximum refractive index and a minimum refractive index, and the difference between the maximum refractive index and the minimum refractive index is greater than 0, and less than or equal to 2.1.

7. The waveguide structure as claimed in claim 1, wherein the gradually increasing refractive index is in a range from 1.4 to 3.5.

8. The waveguide structure as claimed in claim 1, wherein the first grating pillars are formed in a periodic arrangement, and a period of the periodic arrangement is in a range from 250 nm to 750 nm.

9. The waveguide structure as claimed in claim 1, wherein from a cross-sectional view of the waveguide structure, a profile of each of the first grating pillars has two parallel sides.

10. The waveguide structure as claimed in claim 9, wherein the profile of each of the first grating pillars is a trapezoid, the two parallel sides are an upper base and a lower base, and the lower base is closer to the waveguide plate than the upper base.

11. The waveguide structure as claimed in claim 10, wherein the lower base is longer than the upper base.

12. The waveguide structure as claimed in claim 1, wherein the waveguide plate has a constant refractive index in a range from 1.5 to 3.

13. The waveguide structure as claimed in claim 1, wherein each of the waveguide combiners further comprises:
    an expander disposed on the waveguide plate and adjacent to the input coupler.

14. The waveguide structure as claimed in claim 13, wherein the expander comprises second grating pillars, and a distance between two adjacent second grating pillars is constant.

15. The waveguide structure as claimed in claim 14, wherein the second grating pillars have different widths.

16. The waveguide structure as claimed in claim 14, wherein the second grating pillars have different thicknesses.

17. The waveguide structure as claimed in claim 13, wherein each of the waveguide combiners further comprises:
    an output coupler disposed on the waveguide plate, wherein the expander is disposed between the input coupler and the output coupler.

18. The waveguide structure as claimed in claim 1, wherein the waveguide combiners are used to couple different color lights, and the different color lights have wavelengths from 380 nm to 750 nm.

19. A display device, comprising:
an image source; and
a waveguide structure configured to couple lights from the image source, wherein the waveguide structure comprises:
    waveguide combiners stacked one upon the other, wherein each of the waveguide combiners comprises:
        a waveguide plate; and
        an input coupler disposed on the waveguide plate;
    wherein the input coupler of at least one of the waveguide combiners comprises first grating pillars, each of the first grating pillars has a plurality of stacked layers, a lower stacked layer of the plurality of stacked layers includes at least one upper surface exposed from an upper stacked layer of the plurality of stacked layers, and each of the first grating pillars has a gradually increasing refractive index from a topmost layer to a bottommost layer of the plurality of stacked layers.

20. The display device as claimed in claim 19, further comprising:

a collimator disposed between the image source and the waveguide structure.

* * * * *